(12) United States Patent
Davis, Jr. et al.

(10) Patent No.: US 10,094,570 B2
(45) Date of Patent: *Oct. 9, 2018

(54) INJECTOR APPARATUS AND REHEAT COMBUSTOR

(71) Applicant: General Electric Company, Schenectady, NY (US)

(72) Inventors: Lewis Berkley Davis, Jr., Niskayuna, NY (US); Gregory Thomas Foster, Greer, SC (US); Kaitlin Marie Graham, Greenville, SC (US); Krishnakumar Venkataraman, Simpsonville, SC (US); Stanley Kevin Widener, Greer, SC (US)

(73) Assignee: General Electric Company, Schenectady, NY (US)

( * ) Notice: Subject to any disclaimer, the term of this patent is extended or adjusted under 35 U.S.C. 154(b) by 275 days.

This patent is subject to a terminal disclaimer.

(21) Appl. No.: 14/567,768

(22) Filed: Dec. 11, 2014

(65) Prior Publication Data

US 2016/0169519 A1 Jun. 16, 2016

(51) Int. Cl.
*F02C 9/28* (2006.01)
*F23R 3/34* (2006.01)
(Continued)

(52) U.S. Cl.
CPC ............... *F23R 3/34* (2013.01); *F02C 9/28* (2013.01); *F23N 1/00* (2013.01); *F23N 5/003* (2013.01);
(Continued)

(58) Field of Classification Search
CPC .. F23R 3/34; F23R 3/346; F23R 2900/03341; F02C 3/16; F02C 6/003; F02C 9/28
See application file for complete search history.

(56) References Cited

U.S. PATENT DOCUMENTS

| 4,438,625 A | 3/1984 | Rice | |
| 4,735,052 A * | 4/1988 | Maeda | F02C 9/28 |
| | | | 60/733 |

(Continued)

FOREIGN PATENT DOCUMENTS

| EP | 1028237 B1 | 10/2003 |
| EP | 2199674 A1 | 6/2010 |

(Continued)

OTHER PUBLICATIONS

U.S. Appl. No. 14/567,753 Office Action 1 dated Dec. 15, 2016 32 pages.

(Continued)

*Primary Examiner* — Andrew Nguyen
(74) *Attorney, Agent, or Firm* — Ernest G. Cusick; Hoffman Warnick LLC

(57) ABSTRACT

Aspects of the present disclosure provide an apparatus including: an injector in fluid communication with an aft section of a reheat combustor in a power generation system, the aft section being positioned downstream of a combustion reaction zone in the reheat combustor, and positioned upstream of a turbine stage of the power generation system, wherein the turbine stage includes a turbine nozzle and a turbine blade row; and a conduit in fluid communication with the injector, wherein the conduit delivers at least one of a fuel from a fuel supply line and a carrier gas to the injector.

8 Claims, 9 Drawing Sheets

(51) Int. Cl.
*F23N 1/00* (2006.01)
*F23N 5/00* (2006.01)

(52) U.S. Cl.
CPC ...... *F23N 2023/04* (2013.01); *F23N 2023/08* (2013.01); *F23N 2041/20* (2013.01); *F23R 2900/03341* (2013.01)

(56) References Cited

U.S. PATENT DOCUMENTS

| | | | |
|---|---|---|---|
| 5,197,278 A * | 3/1993 | Sabla | F23R 3/34 |
| | | | 60/733 |
| 5,577,378 A | 11/1996 | Althaus et al. | |
| 6,079,197 A | 6/2000 | Attia | |
| 6,619,026 B2 * | 9/2003 | Carelli | F02C 3/16 |
| | | | 60/39.17 |
| 6,691,503 B2 | 2/2004 | Tiemann | |
| 6,691,519 B2 | 2/2004 | Little | |
| 6,796,130 B2 | 9/2004 | Little et al. | |
| 6,817,187 B2 | 11/2004 | Yu | |
| 6,840,049 B2 | 1/2005 | Ziegner | |
| 6,981,358 B2 | 1/2006 | Bellucci et al. | |
| 7,040,097 B2 | 5/2006 | Mukherjee | |
| 7,603,863 B2 * | 10/2009 | Widener | F23R 3/20 |
| | | | 415/114 |
| 7,784,261 B2 | 8/2010 | Little | |
| 7,934,381 B2 | 5/2011 | Eroglu et al. | |
| 7,966,822 B2 | 6/2011 | Myers et al. | |
| 8,092,175 B2 | 1/2012 | Beeck et al. | |
| 8,112,216 B2 | 2/2012 | Davis, Jr. et al. | |
| 8,220,271 B2 | 7/2012 | Poyyapakkam et al. | |
| 8,322,121 B1 | 12/2012 | Marcell | |
| 8,511,059 B2 | 8/2013 | Poyyapakkam et al. | |
| 2008/0134685 A1 * | 6/2008 | Bunker | F01D 5/146 |
| | | | 60/776 |
| 2008/0264033 A1 * | 10/2008 | Lacy | F23R 3/286 |
| | | | 60/39.49 |
| 2009/0064654 A1 * | 3/2009 | Kirzhner | F02C 6/02 |
| | | | 60/39.17 |
| 2009/0185903 A1 | 7/2009 | Beeck et al. | |
| 2009/0277178 A1 | 11/2009 | Carroni et al. | |
| 2009/0277182 A1 | 11/2009 | Engelbrecht | |
| 2009/0280443 A1 | 11/2009 | Carroni et al. | |
| 2009/0301054 A1 | 12/2009 | Simpson et al. | |
| 2010/0000222 A1 * | 1/2010 | Price | F01D 15/10 |
| | | | 60/773 |
| 2010/0174466 A1 | 7/2010 | Davis, Jr. et al. | |
| 2011/0265487 A1 * | 11/2011 | Gauthier | F02C 7/228 |
| | | | 60/773 |
| 2011/0284669 A1 | 11/2011 | Rathmann et al. | |
| 2011/0314825 A1 | 12/2011 | Stryapunin et al. | |
| 2012/0036824 A1 | 2/2012 | Buss et al. | |
| 2012/0055162 A1 | 3/2012 | Eroglu et al. | |
| 2012/0260622 A1 | 10/2012 | Poyyapakkam et al. | |
| 2012/0272659 A1 | 11/2012 | Syed et al. | |
| 2012/0297777 A1 | 11/2012 | Poyyapakkam et al. | |
| 2012/0297787 A1 | 11/2012 | Poyyapakkam et al. | |
| 2012/0328421 A1 * | 12/2012 | McMahan | F01D 9/023 |
| | | | 415/182.1 |
| 2013/0306181 A1 | 11/2013 | Mitchell et al. | |
| 2014/0260305 A1 | 9/2014 | Hobbs et al. | |

FOREIGN PATENT DOCUMENTS

| | | |
|---|---|---|
| EP | 2211109 A1 | 7/2010 |
| EP | 2230455 A1 | 9/2010 |
| EP | 2295864 A1 | 3/2011 |
| EP | 2362147 A1 | 8/2011 |
| WO | 2010081612 A1 | 7/2010 |
| WO | 2011020695 A1 | 2/2011 |

OTHER PUBLICATIONS

U.S. Appl. No. 14/567,761, Office Action 1 dated Feb. 28, 2017, 30 pages.
U.S. Appl. No. 14/567,791, Office Action 1 dated Feb. 28, 2017, 33 pages.
U.S. Appl. No. 14/567,753, Final Office Action 1 dated Mar. 24, 2017, 29 pages.
U.S. Appl. No. 14/567,791, Final Office Action 1 dated Aug. 15, 2017, 22 pages.
U.S. Appl. No. 14/567,761, Final Office Action 1 dated Aug. 16, 2017, 18 pages.
U.S. Appl. No. 14/567,753, Office Action 2 dated Feb. 22, 2018, 12 pages.
U.S. Appl. No. 14/567,761, Office Action dated Mar. 7, 2018, 9 pages.
U.S. Appl. No. 14/567,791, Office Action dated Mar. 7, 2018, 9 pages.
U.S. Appl. No. 14/567,753, Notice of Allowance dated Jul. 16, 2018, 21 pages.
U.S. Appl. No. 14/567,761, Notice of Allowance dated Jul. 12, 2018, 17 pages.
U.S. Appl. No. 14/567,791, Notice of Allowance dated Jul. 12, 2018, 15 pages.

* cited by examiner

INJECTOR APPARATUS AND REHEAT COMBUSTOR

BACKGROUND OF THE INVENTION

The disclosure relates generally to injector apparatuses and reheat combustors for fuel and air. More specifically, the disclosure relates to reheat combustors and injectors for fuel and air which modify the performance and output of a power generation system, such as a gas turbine system or turbomachine.

Turbine systems are frequently used to generate power for, e.g., electric generators. A working fluid such as hot gas or steam can flow across sets of turbine blades, mechanically coupled to a rotor of the turbine system. The force of the working fluid on the blades causes those blades (and the coupled body of the rotor) to rotate. In many cases, the rotor body is coupled to the drive shaft of a dynamoelectric machine such as an electric generator. In this sense, initiating rotation of the turbine rotor can also rotate the drive shaft in the electric generator to generate an electrical current and a particular power output.

To generate the working fluid in a combustion-based turbomachine, a fuel can combust within a combustor and in the presence of oxygen to generate a hot gas stream for actuating the blades of the turbine system. In some systems, a portion of the air may not react in the combustor, and may continue downstream through the gas turbine system. To improve the power output and efficiency of the turbomachine, this unreacted air can enter another combustor known as a reheat combustor. In the reheat combustor, the unreacted air can combust in the presence of additional fuel to generate more hot gas and actuate a latter turbine stage of the turbomachine. This type of turbomachine is known in the art as a reheat turbine.

A reheat turbine has the potential to attain greater efficiencies than what is currently known in the art. The efficiency of existing combined cycle plants, which can include reheat turbines, may be limited by the output and/or efficiency of the reheat combustor. In particular, designing the reheat combustor to have a different outlet temperature from that of the first combustor can influence power output (e.g., by increasing or decreasing the amount of fuel and combustion energy in the reheat combustor), and emissions (e.g., by combustion reactions in the reheat combustor outputting different amounts of carbon monoxide (CO), carbon dioxide, ($CO_2$) in addition to nitrogen oxide or nitrogen dioxide, known collectively as "$NO_x$").

BRIEF DESCRIPTION OF THE INVENTION

Embodiments of the present disclosure provide injector apparatuses for use in a power generation system, and reheat combustors which may include one of the injector apparatuses. Generally, embodiments of the present disclosure can improve the performance of a combustion-based power generation system by providing additional fuel and air to a downstream area (also known as an "aft section") of a combustion chamber. Diverting a portion of fuel to the injector can increase the amount of combustion reactions occurring within a reheat combustor, reduce the temperature of fluids entering the aft section, and reduce emissions outputs from the reaction chamber. The additional combustion reactions can occur in a preferred region of the chamber downstream of relatively heat-sensitive components, based on the location and technical configuration of the injecting apparatuses and/or reheat combustor components.

A first aspect of the present disclosure provides an apparatus including: an injector in fluid communication with an aft section of a reheat combustor in a power generation system, the aft section being positioned downstream of a combustion reaction zone in the reheat combustor, and positioned upstream of a turbine stage of the power generation system, wherein the turbine stage includes a turbine nozzle and a turbine blade row; and a conduit in fluid communication with the injector, wherein the conduit delivers at least one of a fuel from a fuel supply line and a carrier gas to the injector.

A second aspect of the present disclosure provides an apparatus including: an injector located on a surface of a turbine nozzle of a turbine stage positioned downstream of a reheat combustor, wherein the turbine stage includes the turbine nozzle and a turbine blade row; and a conduit in fluid communication with the injector, wherein the conduit delivers at least one of a fuel from a fuel supply line and a carrier gas to the injector.

A third aspect of the present disclosure provides a reheat combustor including: a reaction chamber positioned between a mixing duct and a turbine nozzle separating the reaction chamber from a turbine stage of the power generation system, wherein the reaction chamber includes a fore section and an aft section, the fore section including a combustion reaction zone from fuel supplied to the reheat combustor from a separate fuel supply line, and wherein an air and a fuel passing through the mixing duct combust in the fore section of the reaction chamber; and an injector located on a surface of one of a wall of the reaction chamber and a surface of the turbine nozzle, wherein the injector delivers at least one of a carrier gas and a portion of the fuel from a fuel supply line to the aft section of reaction chamber.

A fourth aspect of the present disclosure provides an apparatus including: a first injector located on a surface of a turbine nozzle of a turbine stage positioned downstream of a reheat combustor, wherein the turbine stage includes the turbine nozzle and a turbine blade row; a second injector located on a wall of the reheat combustor; and at least one conduit in fluid communication with each of the first injector and the second injector, wherein the at least one conduit delivers at least one of a fuel from a fuel supply line and a carrier gas to an aft section of the reheat combustor through at least one of the first injector and the second injector, and wherein the aft section is positioned downstream of a combustion reaction zone in the reheat combustor.

A fifth aspect of the present disclosure provides a reheat combustor including: a reaction chamber positioned between a mixing duct and a turbine nozzle of a turbine stage positioned downstream of the reaction chamber, the turbine stage including the turbine nozzle and a turbine blade row, wherein the reaction chamber includes a fore section and an aft section, and wherein an air and a first portion of a fuel passing through the mixing duct combust in the fore section of the reaction chamber; a first injector positioned on a surface of the turbine nozzle, wherein the first injector delivers a first portion of a carrier gas and a second portion of the fuel to the aft section of the reaction chamber; and a second injector extending through a wall of the reaction chamber, wherein the second injector delivers a second portion of the carrier gas and a third portion of the fuel to the aft section of the reaction chamber.

A sixth aspect of the present disclosure provides: a controller operatively connected to at least one valve positioned between a fuel supply line and at least one injector for injecting a fuel and a carrier gas into an aft section of a reheat combustor of a power generation system, wherein the aft section of the reheat combustor is positioned downstream of a reaction zone within the reheat combustor; and a sensor in communication with the controller for determining one of an inlet temperature, an outlet temperature, and an emissions output of the reheat combustor; wherein the controller is configured to adjust a position of the at least one valve based on one of the inlet temperature, the outlet temperature, and the emissions output of the reheat combustor.

A seventh aspect of the present disclosure provides: a reaction chamber positioned between a first turbine stage of a power generation system and a turbine stage of the power generation system, wherein the turbine stage comprises a turbine nozzle and a turbine blade row; a plurality of injectors positioned on a wall of the reaction chamber; and a conduit in fluid communication with the plurality of injectors, wherein the conduit delivers at least one of fuel from a fuel supply line and a carrier gas to the reaction chamber through the plurality of injectors.

An eighth aspect of the present disclosure provides a reheat combustor including: a reaction chamber positioned between a first turbine stage of a power generation system and a turbine stage of the power generation system, wherein the turbine stage comprises a turbine nozzle and a turbine blade row; and a plurality of injectors for delivering at least one of a fuel from a fuel supply line and a carrier gas to the reaction chamber, wherein each of the plurality of injectors is positioned on one of a wall of the reaction chamber and a surface of the turbine nozzle in the turbine stage.

A ninth aspect of the present disclosure provides a turbomachine including: a first stage combustor for reacting a fuel with a compressed air, wherein an unreacted portion of the compressed air passes through a first turbine stage as an excess air; a reaction chamber for reacting the fuel with the excess air in fluid communication with the first turbine stage, and positioned between the first turbine stage and a turbine stage of the power generation system, wherein the turbine stage comprises a turbine nozzle and a turbine blade row; a plurality of injectors positioned on one of the reaction chamber and a surface of the turbine nozzle; and a conduit in fluid communication with the plurality of injectors for delivering at least one of a fuel and a carrier gas to the reaction chamber, wherein a temperature of the reaction chamber causes the fuel, the excess air, and the carrier gas to combust and fully react within the reaction chamber.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
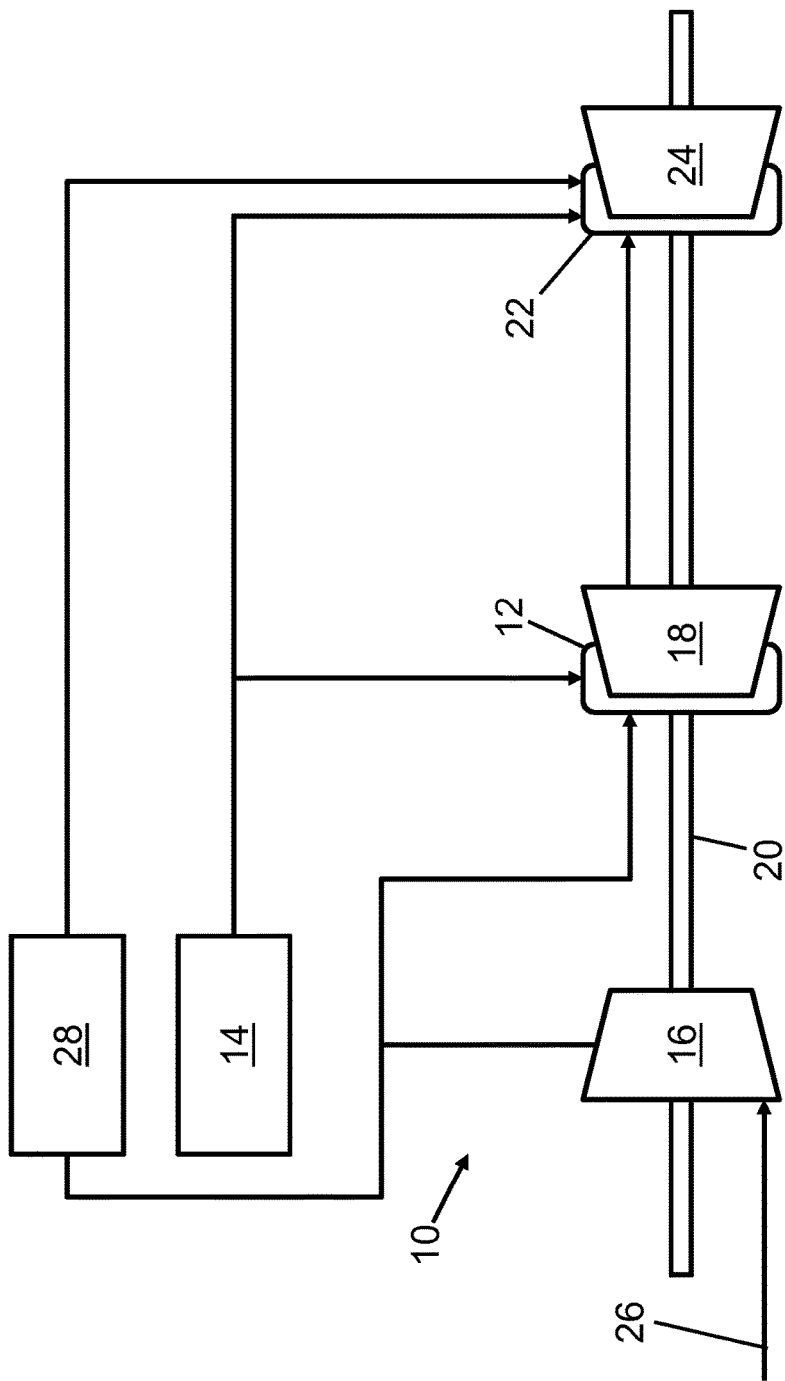
FIG. 1 is a schematic view of a conventional gas turbine system which includes a reheat combustor.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As discussed herein, aspects of the invention relate generally to apparatuses for injecting fuel and air to a combustor of a power generation system, particularly a reheat combustor of a combustion-based power generation system such as a gas turbine. Apparatuses according to the present disclosure can include, for example, an injector extending through the surface of a turbine nozzle or the wall of a reheat combustor. The injector can deliver fuel and/or air into an "aft" section of the reheat combustor, defined generally as a portion of the combustor where combustion reactions do not occur without the injection of additional fuel, e.g., at locations other than an inlet to the reheat combustor. The turbine nozzle throat section can separate the aft section of the reheat combustor from a turbine stage of the power generation system. A conduit can be in fluid communication with the injector, and may divert fuel from a fuel supply line into the injector. The same conduit or a different conduit can direct a carrier gas, such as a cooling air or, a bleed air from a combustor, or other gases including oxygen and/or inert gases (i.e., gases used for injection and/or dilution of fuel), into the injector along with the fuel.

Referring to FIG. 1, a conventional power generation system 10 in the form of a turbomachine is shown. Embodiments of the present disclosure can be adapted for use with power generation system 10 and/or can be integrated into components thereof. Power generation system 10 is shown by example as being a combustion-based turbomachine assembly, though embodiments of the present disclosure can also be adapted for use with other types of combustion systems where applicable. In the setting of combustion-based turbomachines, a combustor 12, connected to a fuel supply 14, is typically located between a compressor 16 and a high pressure (HP) gas turbine 18 of power generation system 10. Fuel supply 14 can be fluidly connected to or otherwise in the form of one or more fuel nozzles coupled to combustor 12. In an embodiment, fuel supply 14 can be fluidly connected to a group positioned circumferentially about combustor 12 and/or other combustors of power generation system 10. Compressor 16 and HP gas turbine 18 can be mechanically coupled to each other through a rotatable shaft 20. To increase power output and/or efficiency, power generation system 10 can also include a reheat combustor 22 and a low pressure (LP) gas turbine 24 in fluid communication with the fluids output from HP gas turbine 18.

Air 26 flows sequentially through compressor 16, combustor 12, HP gas turbine 18, reheat combustor 22, and LP gas turbine 24. The compression provided from compressor 16 can also increase the temperature of air 26. Fuel supply 14 can provide fuel to combustor 12 and reheat combustor 22, which combusts in the presence of air 26 to yield a hot gas stream. The hot gas stream from combustor 12 can enter HP gas turbine 18 to impart mechanical energy to rotatable shaft 20, e.g., by rotating a group of turbine buckets, thereby delivering power back to compressor 16 and/or any loads (not shown) mechanically coupled to rotatable shaft 20. Similarly, fuel provided from fuel supply 14 to reheat combustor 22 can combust in the presence of excess air delivered from gas turbine 18 to yield a hot gas stream to LP gas turbine 24, which can impart additional mechanical energy to rotatable shaft 20, e.g., by rotating turbine buckets within LP gas turbine 24. Power generation system 10 may be one of several individual turbomachines controlled via the same operator and/or may be part of a larger power generation system.

A carrier gas supply 28 can be in communication with combustor 12 and/or reheat combustor 22. To reduce the amount of air 26 diverted from compressor(s) 16 to particular sections of combustor 12 and/or reheat combustor 22, a carrier gas supply 28 can be in fluid communication with combustor 12 and/or reheat combustor 22. Carrier gas supply 28 can generally include any dedicated supply of carrier gas and/or any other component or system from which carrier gas can be drawn or repurposed. In a specific example, carrier gas supply 28 can include a compressor in fluid communication with reheat combustor 22 and/or another component. Carrier gas supply 28 can be located within and/or integral to power generation system 10. In other embodiments, carrier gas supply 28 can be external to power generation system 10 as an external component or other external source of carrier gas. Air 26 that otherwise would be used to cool particular components of power generation system 10 can thus be repurposed as a reactant with fuel injected to other areas of combustor 12 and/or reheat combustor 22 according to embodiments of the present disclosure.

Figure 2:
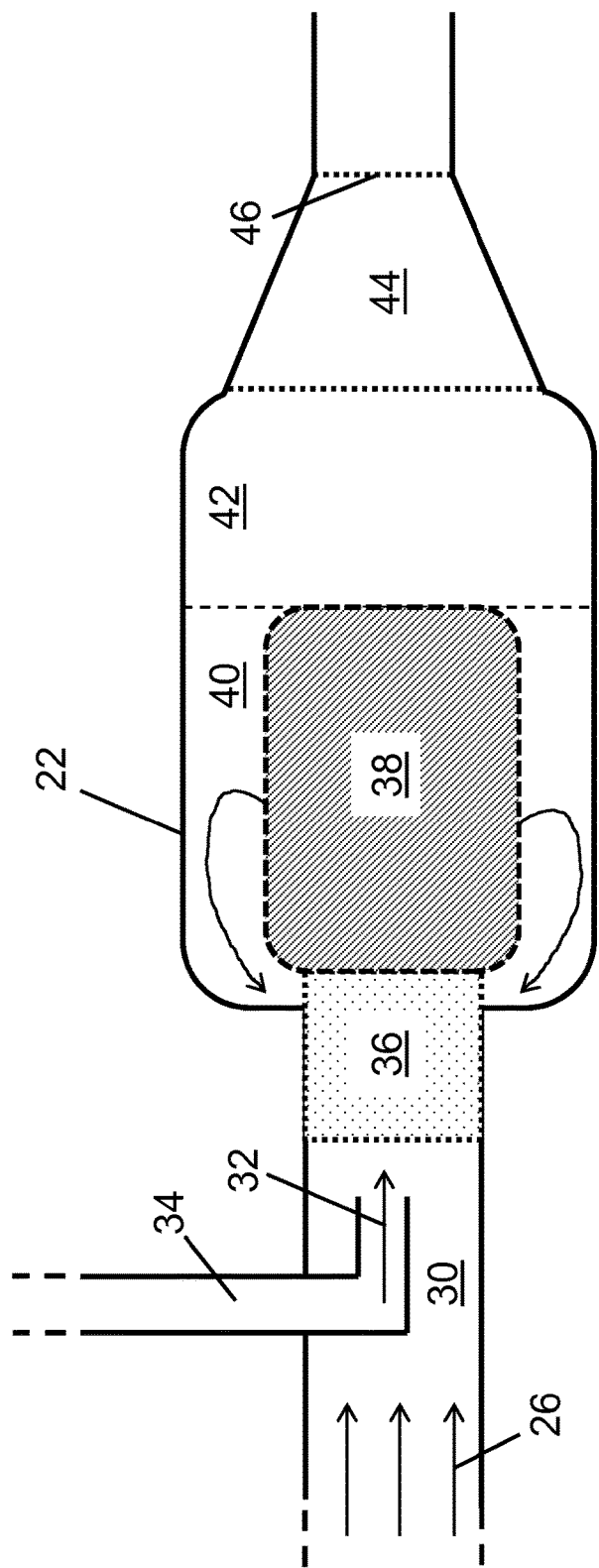
FIG. 2 is a cross-sectional view of a conventional reheat combustor.

Turning to FIG. 2, a cross-sectional view of a conventional reheat combustor 22 capable of being modified into, adapted for, or otherwise used with embodiments of the present disclosure is shown. In operation, air 26 can flow into an inlet 30 to reheat combustor 22. Fuel 32 provided from fuel supply 14 (FIG. 1) via, e.g., a fuel supply line 34 can intermix within a mixing duct 36 of reheat combustor 22. The broken lines shown in fuel supply 34 designate an indeterminate length. Air 26 can be in the form of hot gas discharged from, e.g., HP gas turbine 18 (FIG. 1) and can be mixed with fuel 32 in a particular fashion to reduce the amount of delay before autoignition occurs. The size and length of mixing duct 36 can be chosen to provide a particular delay before autoignition, and a certain type of fuel/air composition before combustion occurs. Reheat combustor 22 can be maintained at a temperature sufficient for combustion reactions to occur therein, e.g., at least approximately 1065° Celsius (C). As used herein, the term "approximately" in relation to a specified numerical value (including percentages of base numerical values) can include all values within ten percentage points of (i.e., above or below) the specified numerical value or percentage, and/or all other values which cause no operational difference or substantial operational difference between the modified value and the enumerated value. The term approximately can also include other specific values or ranges where specified herein.

The mixed air 26 and fuel 32 can combust in a reaction zone 38 of reheat combustor 22 via a process known as autoignition. Autoignition generally refers to a combustion reaction which occurs without the use of a flame or spark located within or upstream relative to the area where reactions occur. Some excess unreacted air in reaction zone 38 can recirculate back to mixing duct 36 to trigger additional combustion reactions, while other portions of unreacted air may continue to other downstream components discussed herein. Generally, the term "upstream" refers to a reference path extending in the direction opposite to the resultant direction in which fluids pass through power generation system 10 (FIG. 1). The term "downstream" refers to a reference path extending in the same direction as the resultant direction in which fluids pass through power generation system 10. Thus, fuel and air generally travel through power generation system 10 in a downstream direction during operation. Reheat combustor 22 can be divided into a fore section 40 and an aft section 42 based on, e.g., where combustion reactions between air 26 and fuel 32 from fuel supply line 34 occur. Aft section 42 can be free of combustion reactions therein, except where additional fuel and carrier gas is injected to aft section 42 according to embodiments of the present disclosure. In any case, at least one turbine nozzle 44 can separate reheat combustor 22 from a turbine stage of power generation system 10 (FIG. 1) (e.g., LP gas turbine 24). Turbine nozzle 44 is shown in a generalized, simplified form and in embodiments can include a complex geometry (e.g., channels within or outside components with airfoil-type geometries and/or dimensions) and/or can be in the form of multiple turbine nozzles 44 in fluid communication with the same combustion chamber 22. Turbine nozzle 44 can include a reduced surface area at its downstream end, which can be known as a throat 46 of turbine nozzle 44. Fluids passing through throat 46 may increase in fluid velocity before passing to a turbine stage downstream of reheat combustor 22 (e.g., LP gas turbine 24). The reaction zone 38 may extend past the end of the aft section 42 of the reheat combustor into the turbine nozzle 44, but may end upstream of the throat 46 of turbine nozzle 44.

Applicants have determined that the efficiency of a conventional reheat combustor may be sub-optimal in particular deployments and/or under particular conditions. In an optimized reheat cycle, the firing temperature of both combustors 12, 22 (FIG. 1) would be approximately equal, while the heat released in combustor 12 would be approximately twice that of reheat combustor 22. The numerous operational and design constraints (e.g., environmental losses, excess reactants, manufacturing tolerances, emissions and/or temperature requirements, etc.) can pose design challenges to creating these conditions within reheat combustor 22 during operation. In particular, applicants have determined that the temperature of inlet 30 in reheat combustor 22 appears to constrain the entire operating cycle of power generation system 10 (FIG. 1). In an example of a conventional power generation system 10, the temperature of inlet 30 of reheat combustor 22 can be, e.g., approximately 925° C. This temperature can be related to variables such as, e.g., pressure drop across reheat combustor 22 and the number of autoignition reactions therein. The discharge temperature from reheat combustor 22 can be approximately 1550° C., and may be constrained by emissions (e.g., CO or $NO_x$) and the residence time needed to achieve efficient combustion with emissions below particular levels (e.g., maximum amounts of exhaust allowed under environmental regulations).

Embodiments of the present disclosure can modify these constraints and/or improve performance by applying a late lean injection of additional fuel and/or air to a combustor at particular locations, thereby increasing properties such as the inlet temperature thereof. As used herein, late lean injection generally refers to any injection of fuel and/or air positioned downstream relative to inlet 30. Increasing the temperature of inlet 30 can allow, e.g., firing temperature of the first stage (i.e., temperature at which combustion occurs within combustor 12), to increase and thereby improve the efficiency of the entire cycle.

Figure 3:
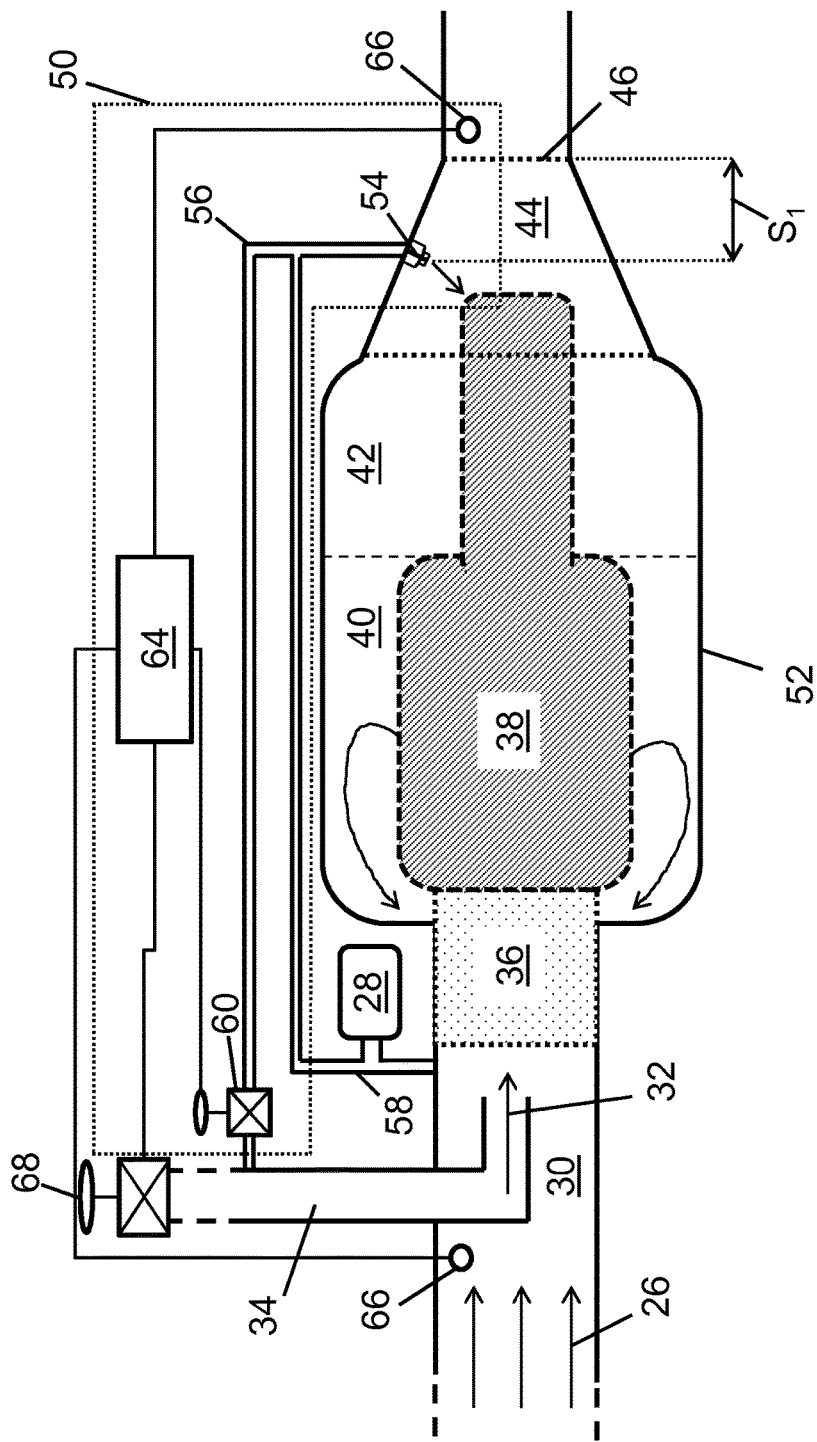
FIGS. 3-7 provide cross-sectional views of reheat combustors and apparatuses according to embodiments of the present disclosure.

Turning to FIG. 3, an apparatus 50 and reheat combustor 52 according to embodiments of the present disclosure are shown. Apparatus 50 can include an injector 54 extending through a surface of turbine nozzle 44. Embodiments of apparatus 50 can include any currently known or later developed instrument for injecting a fluid. As examples, injector 54 can be in the form of a top-feed, side-feed, and/or body injector with a particular nozzle such as an expansion deflection (also known as "pintle") nozzle, a disc nozzle, a ball nozzle, etc. In any case, injector 54 can be connected to and in fluid communication with a conduit 56 for diverting an amount of fuel 32 from fuel supply line 34. In addition, injector 54 can be in fluid communication with air 26 from inlet 30 through an air conduit 58 positioned between inlet 30 and injector 54. Air conduit 58 can optionally be in fluid communication with carrier gas supply 28 to deliver carrier gas from a source other than inlet 30 to injector 54, such as a dedicated supply of carrier gas positioned within or external to power generation system 10 (FIG. 1) or unreacted air from compressor 16 (FIG. 1). Carrier gas from carrier gas supply 28 can optionally be intermixed with excess air from inlet 30 within air conduit 58.

Apparatus 50 can be dimensioned to provide specific operational characteristics. A separation distance $S_1$ between injector 54 and throat 46 may be sized to allow substantially all (e.g., at least approximately 95% of) fuel 32 to ignite in reheat combustor 52 and fully react before flowing through throat 46 into downstream components, such as LP gas turbine 24 (FIG. 1). In an example embodiment, separation distance $S_1$ can have a dimension of between approximately 2.0 centimeters and approximately 20 centimeters. The flow of fluids in conduit 56 and air conduit 58 and/or the size of injector 54 can be controlled and/or selected such that a mass ratio of carrier gas to fuel (e.g., a mass of injected air and/or carrier gas divided by a mass of injected fuel 32) in injector 54 is between approximately one-to-one and approximately five-to-one.

Injector 54 can be oriented in a particular direction, shown by example in FIG. 3 as being oriented substantially in opposition to a flow of fluids such as reactants and/or combusted reaction products through reheat combustor 52 and turbine nozzle 44. As used herein, "in opposition" encompasses all orientations where at least some fuel and at least some carrier gas from first injector 54 and fluids within and/or exiting reheat combustor 52 will collide with each other (e.g., within turbine nozzle 44) before continuing to flow as an at least partially intermixed fluid. In one embodiment, injector 54 and the flow of fluids (e.g., air 26) through or from reheat combustor 52 can be directly opposed along a particular linear direction, i.e., having opposite or approximately opposite orientations, such that the angular orientation of injector 54 and the fluid flow through reheat combustor 52 differ by approximately 180° (i.e., within approximately five degrees more or less than 180°). In another embodiment, injector 54 and a direction of fluid flow through reheat combustor 52 can be at least partially directed in opposing directions, i.e., with one fluid flow component vector in the same direction as the other outlet along one axis, with another component vector in a different direction from the other outlet along a different axis. For example, a flow of fluid through reheat combustor 52 can be in a substantially horizontal reference direction, while injector 54 can be oriented at an angle relative to this fluid flow with a magnitude of no more than approximately (e.g., within five degrees of) 45°. In the example of FIG. 3, injector 54 delivers fuel and carrier gas in a direction with a component vector oriented against the flow of fluid through reheat combustor 52. Any number of possible relative orientations between a flow of fluid through reheat combustor 52 and injector 54 are contemplated in embodiments of the present disclosure, so long as at least a portion of the carrier gas and fuel collides, intermixes, and/or reacts with at least a portion of fluid travelling through reheat combustor 52.

To control the amount of fuel 32 provided from fuel supply line 34 to injector 54, apparatus 50 can include a valve 60 positioned between fuel supply line 34 and conduit 56. In some embodiments, valve 60 may be configured to divert at most approximately twenty percent of the total fuel 32 in fuel supply line 34 to conduit 56. This proportion may allow, e.g., a majority of combustion reactions in reheat combustor 52 to occur within fore section 40, while the provided fuel can be used for a smaller number of combustion reactions occurring in aft section 42 and/or turbine nozzle 44. Dynamic control over the amount of combustion reactions in aft reaction zone 38 from fuel and carrier gas of injector 54, can be provided via a controller 64 operatively connected to valve 60. Controller 64 can generally include any type of computing device capable of performing operations by way of a processing component (e.g., a microprocessor) and as examples can include a computer, computer processor, electric and/or digital circuit, and/or a similar component used for computing and processing electrical inputs. Example components and operative functions of controller 64 are discussed in detail elsewhere herein.

A sensor 66 can be in communication with controller 64 and can be positioned, e.g., within inlet 30 to reheat combustor 52 or downstream of reaction zone 38 therein. Sensor(s) 66 can be in the form of a temperature sensor and/or an emission sensor for evaluating a temperature or amount of emissions (such as $NO_x$) at a particular location. Sensor(s) 66 in the form of a temperature sensor can include thermometers, thermocouples (i.e., voltage devices indicating changes in temperature from changes in voltage), resistive temperature-sensing devices (i.e., devices for evaluating temperature from changes in electrical resistance), infrared sensors, expansion-based sensors (i.e., sensors for deriving changes in temperature from the expansion or contraction of a material such as a metal), and/or state-change sensors. Where one or more sensors 66 include temperature sensors, the temperature of fluid(s) passing through the location of sensor(s) 66 can be measured and/or converted into an electrical signal or input. Sensor(s) 66 in the form of emission sensors can include general-purpose gas detectors, thermal conductivity detectors, calorimetric detector tubes, and/or similar devices for measuring the amount or concentration of particular substances in a stream of fluid or sample of exhaust air. Example types of emissions measured with sensor(s) 66 can include, e.g., nitrogen oxide and nitrogen dioxide ($NO_x$) and/or carbon monoxide (CO), and/or oxygen ($O_2$). In any case, the relevant emissions can be measured in terms of total weight or relative molecular weight (e.g., moles of $NO_x$ or CO per gram of total exhaust), and may be converted into an electrical signal or input to controller 64. Sensor(s) 66 may also detect or calculate parameters derived from algorithms that infer the value of interest, e.g., temperature or gas composition, based on measurements at other locations within the gas turbine and mathematical models of the physics of gas flow through the turbine, where the calculations are performed in conjunction with controller 64. Here, sensor(s) 66 can include components for measuring variables related to temperature and processing components (e.g., computer software) for prediction and/or calculating values of temperature or other metrics based on the related variables. In general, the term "determining" in the context of sensor(s) 66 refers to the process of finding a particular value by direct measurement, predictive modeling, derivation from related quantities, and/or other mathematical techniques for measuring and/or finding a particular quantity.

Controller 64, by way of a mechanical coupling to valve 60, can adjust a position of valve 60 based on inputs and/or signals provided from sensor(s) 66. In an example embodiment, controller 64 can adjust a position of valve 60 based on an inlet temperature of reheat combustor 52 and/or emissions output from reheat combustor 52. The controlling of valve 60 can increase or decrease an amount of fuel 32 provided from fuel supply line 34 into conduit 56. Controller 64 can include program code installed by a user for relating one or more variables (e.g., temperatures and/or emission outputs) to magnitudes of combustion and/or inputs (e.g., amounts of fuel or air to inject through injector 54) for increasing or decreasing the amount of combustion within reheat combustor 52 by a particular amount.

In an example embodiment, controller 64 can adjust valve 60 to divert, e.g., between approximately ten and approximately twenty percent of fuel 32 from fuel supply line 34 to conduit 56, thereby adjusting the tolerance of reheat combustor 52 to higher temperatures at inlet 30. Specifically, reducing the amount of fuel 32 combusted in an upstream combustor (e.g., combustor 12 (FIG. 1)) can reduce the amount of fuel present in inlet 30 before mixing duct 36, and thus reduce the likelihood of premature combustion reactions occurring therein. Controller 64 can control the percentage of fuel 32 provided from fuel supply line 34 based on operating conditions detected with sensor(s) 66 and/or the composition of fuel 32. In addition, controller 64 can control a relative amount of fuel 32 delivered to reheat combustor 52 instead of a different combustor (e.g., combustor 12) by way of a fuel supply valve 68 operatively connected to and/or positioned within fuel supply line 34. Controller 64 can control a total amount of fuel 32 provided to reheat combustor 52, e.g., through fuel supply line 34 and conduit 56, by its operative connection to fuel supply valve 68. Although valve 60 and fuel supply valve 68 are shown by example in FIG. 3 as being separate components, a three-way valve (not shown) may be substituted for valve 60 and fuel supply valve 68 to perform the same functions. Other valves and groups of valves discussed herein for controlling relative amounts of fluid can also be replaced by multidirectional valves (not shown) where applicable.

Figure 4:
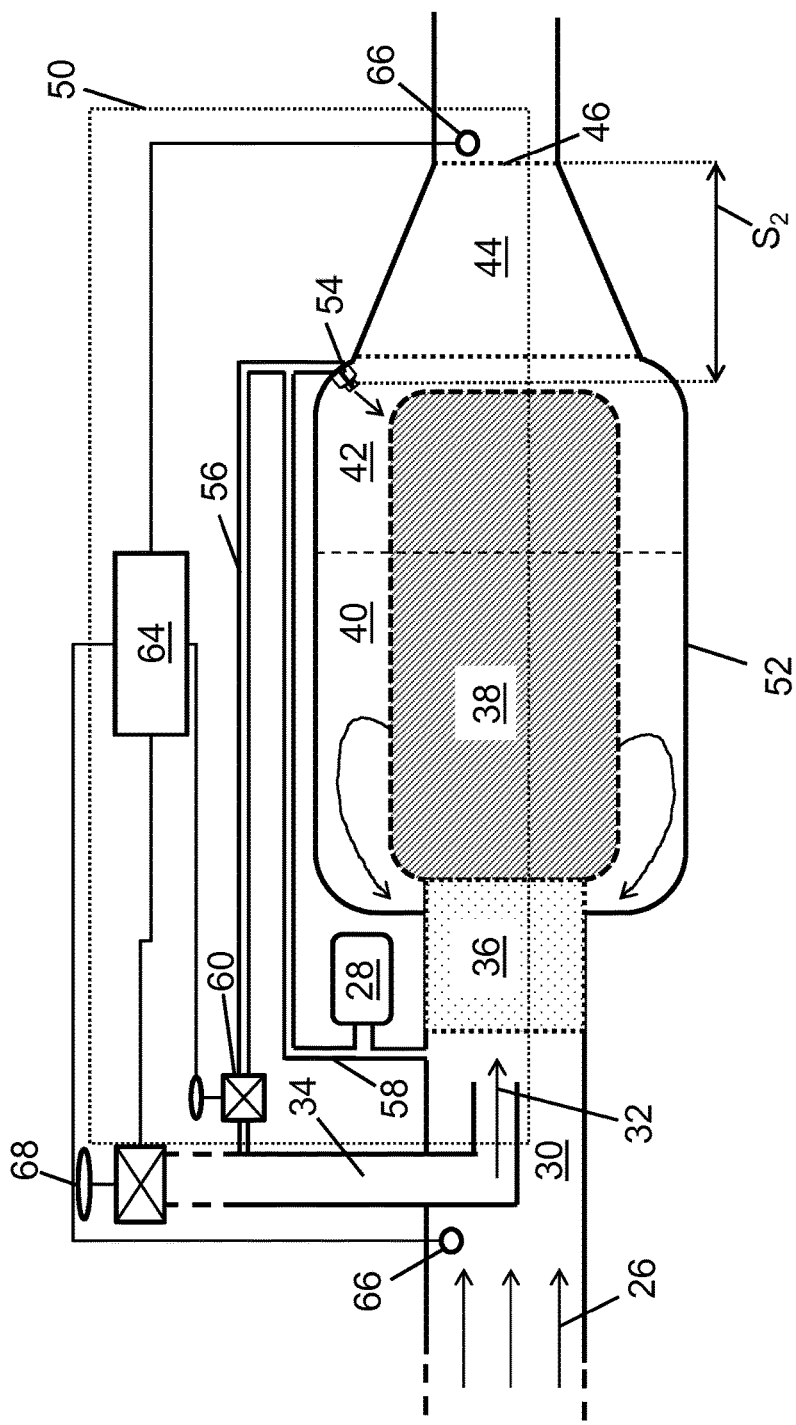

Turning to FIG. 4, another embodiment of reheat combustor 52 is shown. In contrast to FIG. 3, FIG. 4 shows reheat combustor 52 with injector 54 in fluid communication with aft section 42 of reheat combustor 52. As is described elsewhere herein, aft section 42 can be defined as a portion of reheat combustor 52 located downstream of reaction zone 38 where combustion does not occur without late lean injection. In the embodiment shown in FIG. 4, conduit 56 can communicate fuel 32 from fuel supply line 34 to injector 54. In addition, air conduit 58 can provide fluid communication of air and/or carrier gas from inlet 30 and/or carrier gas supply 28 to injector 54. The various additions and/or modifications described elsewhere herein with respect to FIG. 3 (e.g., the placement, use, and/or operation of valve 60, controller 64, and sensors 66) yet not specifically discussed with respect to FIG. 4 are useable and/or adaptable for all embodiments of apparatus 50 and reheat combustor 52. In addition, a separation distance $S_2$ between injector 54 in aft section 42 of reheat combustor 52 can allow substantially all (e.g., at least approximately 95%) of fuel 32 to ignite and fully react within reheat combustor 52 before reaching throat 46 of turbine nozzle 44. The flow of fluids in conduit 56 and air conduit 58 and/or the size of injector 54 can also allow a mass ratio of air to fuel in injector 54 to be between approximately one-to-one and approximately five-to-one.

FIGS. 3 and 4, together, depict alternative embodiments of apparatus 50 and reheat combustor 52 according to the present disclosure. In some situations, a conventional reheat combustor 22 (FIGS. 1, 2) can be machined, modified, retrofitted, and/or otherwise processed into reheat combustor 52 with injector 54 installed therein, which can extend through a wall/surface of aft section 42 or turbine nozzle 44. In this configuration, air 26 and fuel 32 injected via injector 54 can combust in aft section 42. The remainder of air 26 and fuel 32 introduced to reheat combustor 54, i.e., from fuel supply line 34, can combust in fore section 40. As is shown in FIG. 3, reaction zone 38 can be substantially continuous reaction zone extending from fore section 40 of reheat combustor 52, through aft section 42, and up to and/or including turbine nozzle 44 without crossing throat section 46. The additional modifications discussed herein with respect to apparatus 50 can also be applied to reheat combustor 52 where desired (e.g., the placement, use, and/or operation of valve 60, controller 64, sensors 66). In any event, injector 54 of reheat combustor can be positioned within either aft section 42 or turbine nozzle 44 to provide different amounts of intermixing and/or additional combustion within reheat combustor 52.

Embodiments of apparatus 50 can alter the performance of power generation system 10 (FIG. 1) during operation. For instance, the injection of fuel into reheat combustor 52 at aft section 42 can allow additional fuel to be provided to earlier combustor stages (e.g., combustor 12 (FIG. 1) because of a higher temperature tolerance at inlet 30 of reheat combustor 52. The greater temperature tolerance at inlet 30 can be based at least partially on the diversion of some fuel 32 into injector 54, thereby reducing the amount of fuel provided to inlet 30 and the risk of premature combustion within inlet 30. In operation, turbine nozzle 44 can be cooled by way of carrier gas (e.g., from carrier gas supply 28) at a particular temperature (e.g., approximately 315° C.), and this carrier gas can afterwards be mixed with fuel 32 provided from fuel supply line 34 before entering injector 54. In an example embodiment, this mixing can increase the temperature of inlet 30 by approximately 140° C. to an elevated temperature of approximately 1065° C. In addition, the flow of fuel to combustor 12 can increase by approximately twenty percent which can represent, e.g., approximately ten percent of the total fuel provided to power generation system 10. This portion of the total fuel can be provided from other combustors using valve 68. Conversely, the fuel provided to reheat combustor 52 is twenty percent lower than in a conventional assembly (representing, e.g., approximately ten percent of the total gas turbine fuel), causing reheat combustor 52 to become more tolerant of the increased temperature of inlet 30.

Figure 5:
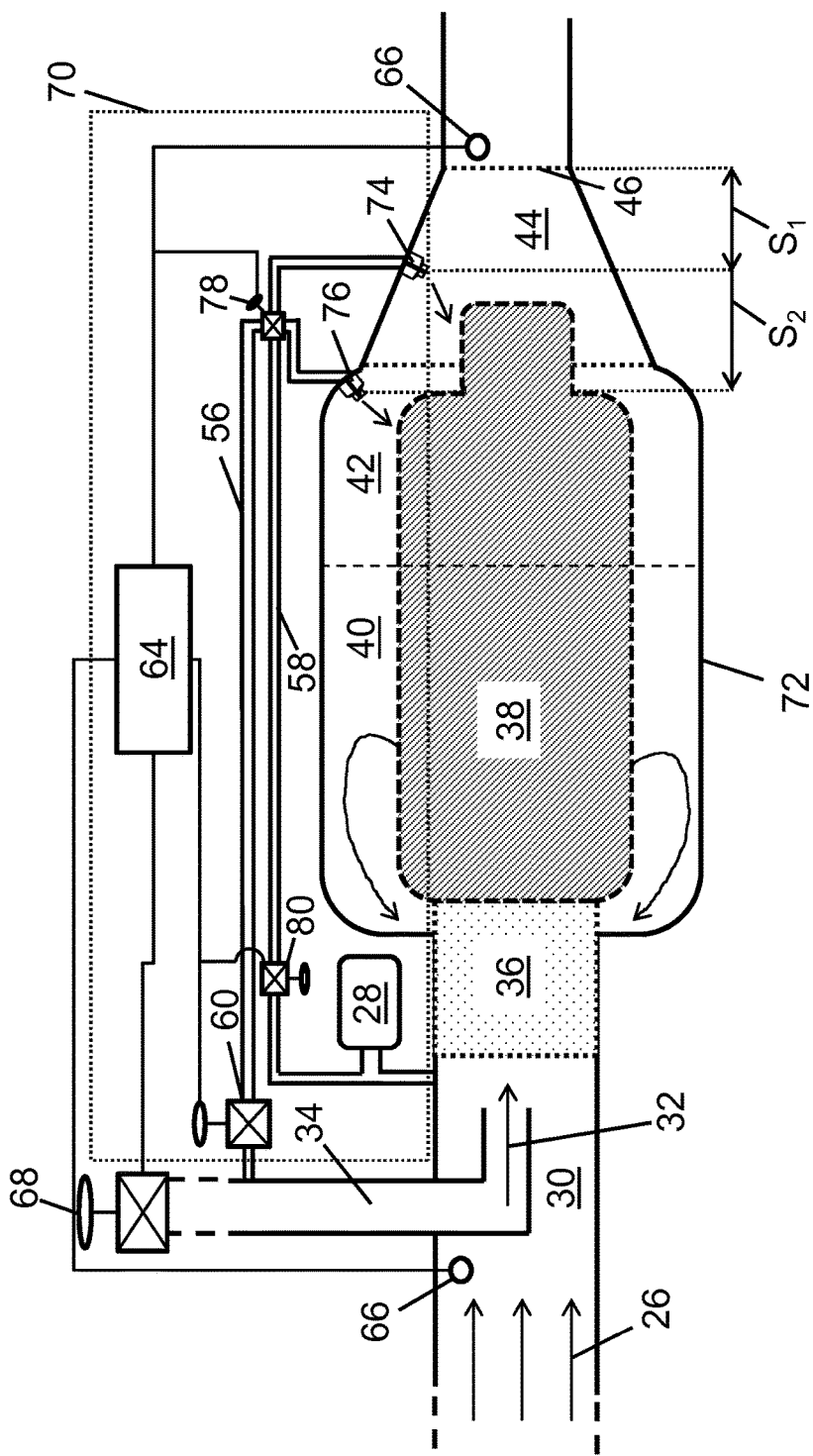

Turning to FIG. 5, an apparatus 70 according to embodiments of the present disclosure is shown. Apparatus 70 can form at least part of a reheat combustor 72. Several of the elements and/or components discussed herein with respect to apparatus 50 and reheat combustor 52 are adaptable and/or modifiable for use with apparatus 70 and reheat combustor 72. Reheat combustor can be in the form of a reaction chamber positioned between inlet 30 and turbine nozzle 44, and may be shaped, sized, etc., for a predetermined level of combustion to take place therein. Apparatus 70 can include a first injector 74 extending through a surface of turbine nozzle 44. Apparatus 70 can also include a second injector 76 extending through a wall of reheat combustor 72.

Conduit 56 and air conduit 58 can each be in fluid communication with first injector 74 and second injector 76. Conduit 56 can deliver fuel 32 from fuel supply line 34 to first and second injectors 74, 76. Air conduit 58 can deliver air from inlet 30 and/or carrier gas supply 28 (e.g., in the form of unreacted air) to first and second injectors 74, 76. First and second injectors 74, 76 can deliver fuel 32 and air 26 to reheat combustor 72 in any desired relative proportion. In an example embodiment, each injector 74, 76 can provide fuel 32 and air 26 to reheat combustor 72 in a mass ratio of approximately one (i.e., with the same amounts and/or flow rates of fuel 32 and air 26). Reheat combustor 72 can be separated into fore section 40 and aft section 42. Fore section 40 can be defined as a portion of reheat combustor 72 where combustion reactions from fuel 32 exiting fuel supply line 34 can occur, i.e., within reaction zone 38. Aft section 42 can be defined as a portion of reheat combustor 72 where combustion reactions from fuel and air exiting first and second injectors 74, 76 occur. Thus, aft section 42 is positioned downstream of fore section 40 within reheat combustor 72.

Apparatus 70 can include valve 60 positioned between fuel supply line 34 and conduit 56. Apparatus 70 can also include fuel supply valve 68 mechanically coupled to fuel supply line 34. Fuel supply valve 68 can control an amount of fuel delivered to reheat combustor 72 and other combustors (not shown). Valve 60 and/or fuel supply valve 68 can be operatively connected to controller 64. Controller 64 can adjust the position(s) of valve 60 and/or fuel supply valve 68 based on operational characteristics of reheat combustor 72. These operational characteristics can include, e.g., a temperature of inlet 30 and/or an emissions output (e.g., CO and/or $NO_x$ levels) of reheat combustor 72 determined with sensor(s) 66 in communication with controller 64. Controller 64 can increase the amount of fuel 32 provided to conduit 56 based on emissions being below a predetermined threshold and/or the temperature of inlet 30 being above a predetermined threshold. One or more thresholds can be defined in controller 64 via user inputs and/or mathematical computations and can be stored, e.g., in a memory (not shown) of controller 64. In an embodiment, controller 64 can adjust valve 60 and/or fuel supply valve 68 to divert at most approximately twenty percent of fuel 32 in fuel supply line 34 to conduit 56, and more specifically can divert between approximately ten percent and approximately twenty percent of the fuel in fuel supply line 34 to conduit 56.

Apparatus 70 can include a splitting valve 78 positioned between conduit 56 and first and second injectors 74, 76, for controlling relative proportions of fuel 32 and air 26 delivered to first and second injectors 74, 76. Controller 64 can adjust splitting valve 78 to provide different amounts of fuel 32 and air 26 to injectors 74, 76 based on operational variables, e.g., temperatures of inlet 30 and/or emissions outputs as determined by sensor(s) 66. For example, providing fuel 32 to second injector 76 upstream of first injector 74 can create additional and/or higher temperature combustion reactions because of the greater proximity of injector 76 to reaction zone 38.

First and second injectors 74, 76, can each be separated from throat 46 of nozzle 44 by corresponding first and second separation distances $S_1$, $S_2$. First separation distance $S_1$ can limit the combustion of fuel from first injector 74 to reaction zone 38 before entering throat 46 of turbine nozzle 44. Separation distance $S_1$ can be determined by, e.g., predicting an amount of combustion and a corresponding reaction volume for an anticipated rate of injection through first injector 74, and creating separation distance $S_1$ with at least a predetermined value of length based on this prediction. In an example embodiment, separation distance $S_1$ can have a dimension of between approximately 2.0 centimeters and approximately 20 centimeters. To further increase intermixing of fuel 32 and air 26, first injector 74 and/or second injector 76 can protrude from the surface of turbine nozzle 44 and/or the wall of reheat combustor 72 substantially in opposition to the direction of fluid flow through reheat combustor 72. A general definition of positions which constitute an injector 72, 74 being "in opposition" to a flow of fluid is provided elsewhere herein.

Embodiments of the present disclosure also provide systems for controlling the injection of fuel 32 and air 26 into a separately manufactured or existing reheat combustor 72. Embodiments of apparatus 70 can include controller 64 operatively connected to valve 60, with valve 60 being positioned between fuel supply line 34 and conduit 56 to first and/or second injector 74, 76. As is discussed elsewhere herein, valve 60 can control, e.g., an amount of air provided from fuel supply line 34 into conduit 56. Controller 64 can be in communication with sensor(s) 66 for determining one or more operating conditions of reheat combustor 72, such as a temperature of inlet 30 and/or an emissions output from reheat combustor 72. Controller 64 can include a computer system with instructions (e.g., algorithms, program code, look-up tables, etc.) for adjusting a position of valve 60 and/or other components discussed herein (e.g., fuel supply valve 68, splitting valve 78, and/or an air supply valve 80 discussed elsewhere herein) based on readings from sensor(s) 66.

Embodiments of the present disclosure can also include splitting valve 78 operatively connected to controller 64 for controlling a relative amount of fuel 34 delivered to first injector 74 or second injector 76. A carrier gas control valve 80 can also be operatively connected to controller 64, and may be positioned between carrier gas supply 28 and air conduit 58. Carrier gas control valve 80 can control an amount of air provided from carrier gas supply 28 and/or inlet 30 to first and second injectors 74, 76. In some embodiments, splitting valve 78 may control the amount of air divided between first and second injectors 74, 76, (i.e., first and second portions of air 26 and/or carrier gas from carrier gas supply 28) as an alternative or addition to dividing fuel 34 between first and second injectors 74, 76. Controller 64 can adjust the position of splitting valve 78 and/or carrier gas control valve 80 based on operational characteristics of reheat combustor 72, e.g., a temperature of inlet 30 and/or emission outputs from reheat combustor 72 determined with sensor(s) 66 in communication with controller 64. Although splitting valve 78 is shown by example in FIG. 5 as being a single component, it is understood that valve 78 can be in the form of two separate valves for fuel 32 and air 26, each of which may be positioned between injectors 74, 76 and conduit 56 or air conduit 58. It is understood that embodiments of apparatuses 50, 70, reheat combustors 52, 72, and/or components thereof can be mixed, modified, and/or otherwise applied to each other as desired and/or needed for particular applications.

Figure 6:
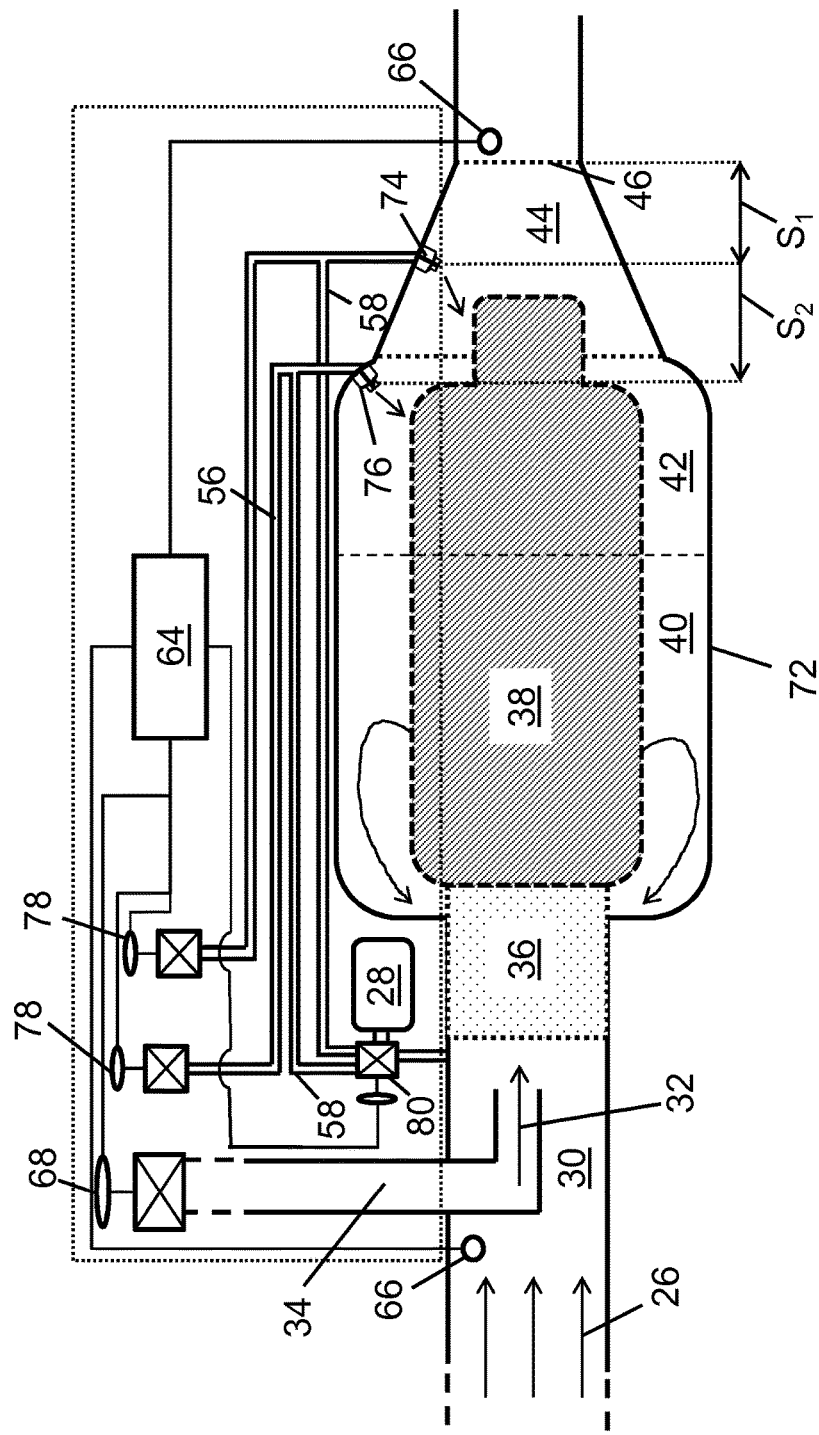

Referring briefly to FIG. 6, an alternative embodiment of apparatus 70 and reheat combustor 72 is shown. Here, multiple conduits 56 and air conduits 58 can be fluidly connected to reheat combustor 72 through first and second injectors 74, 76. In a specific example, as shown in FIG. 6, each injector 74, 76 can be fluidly connected to a respective conduit 56 and air conduit 58. Each conduit 56 and air conduit 58 may also include a corresponding splitting valve 78 for controlling portions of fuel 32 and air 26 provided to each injector 74, 76. Further, in this illustrative example, carrier gas control valve 80 is shown as a three-way valve for controlling portions of air 26 or carrier gases provided to each air conduit 58. It is understood that valve 60, splitting valve(s) 78, and carrier gas control valve 80 can be separated into multiple components and/or combined where desired and/or appropriate to a particular implementation.

Figure 7:
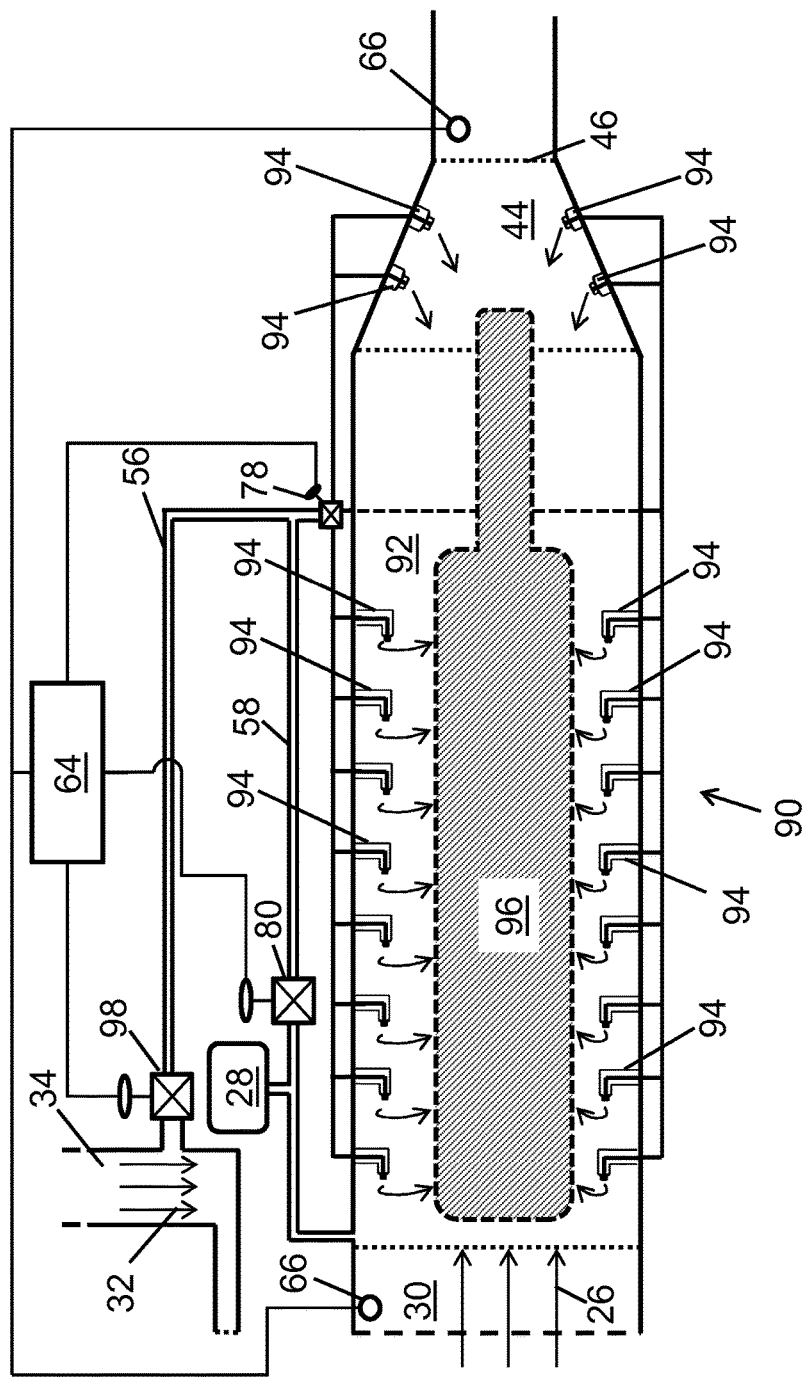

The present disclosure contemplates additional equipment for improving efficiency and otherwise augmenting the amount of power generated in power generation system 10 (FIG. 1). Turning to FIG. 7, embodiments of the present disclosure can include an apparatus 90 which may be a substitute for reheat combustor 22 (FIG. 2) in a conventional power generation system. Apparatus 90 can be in the form of an alternative reheat combustor with a reaction chamber 92 therein, and can be substituted for one or more conventional reheat combustors 22 of power generation system 10 (FIG. 1). Where desired, embodiments of apparatus 90 can also be used in combination with and/or as a substitute for reheat combustors 52, 72 (FIGS. 3-6). Apparatus 90 can be free of mixing ducts 36 (FIGS. 3-6) positioned between inlet 30 and reaction chamber 92.

Apparatus 90 can include a plurality of injectors 94 extending through a wall of reaction chamber 92, and/or additional injectors 94 extending through turbine nozzle 44. As is discussed elsewhere herein, turbine nozzle 44 can separate reaction chamber 92 from a second turbine stage (e.g., LP gas turbine 24 (FIG. 1)) of a particular power generation system. Injectors 94 can be in the form of any currently known or later developed component for injecting air 26 and/or fuel 32, and as non-limiting examples, one or more injectors 94 can be in the form of "rake" style immersion injectors, nozzle injectors, air blast fuel injectors, pressure-atomizing injectors, premix injectors, and/or pre-vaporizing injectors. Injectors 94 can be oriented substantially in opposition to a flow of a fluid (e.g., air 26) through reaction chamber 92, such that intermixing of fuel and air with the fluid(s) flowing through apparatus 90 increases. In an example embodiment, the ratio of fuel to carrier gas in each one of injectors 94 can be, e.g., approximately one-to-one, or can vary from this amount based on a position and/or desired value or range of values for the operating characteristics of apparatus 90. In any event, fuel 32 injected to apparatus 90 through injectors 94 can make up the entirety of fuel 32 injected to apparatus 90, without a primary fuel supply line (e.g., fuel supply line 34) being in direct fluid communication with reaction chamber 92 of apparatus 90.

The use of multiple injectors 94 can reduce or altogether eliminate the presence of mixing duct 36 (FIGS. 2-6) between inlet 30 and reaction chamber 92. Where reaction chamber 92 is approximately the same length as reheat combustors 22, 52, 72, the addition of injectors 94 and absence of mixing duct 36 may change the amount of temperature and/or time needed for of fuel 32 and air 26 to combust therein. In an embodiment, fuel 32 can combust within reaction chamber 92 less than approximately one millisecond after exiting a particular injector 94. It has been discovered that this change in reaction conditions can allow a greater amount of air 26 and fuel 32 to react, a more complete burnout of emissions such as carbon monoxide (CO), and reduction in the overall reaction temperature throughout reaction chamber 92. These changes to the reaction conditions are, in part, due to the reduced amounts of fuel 32 provided by each injector 94 along the length of reaction chamber 92 and nozzle 44. The more complete combustion of reactants in apparatus 90, as compared to conventional reheat combustors 22, can also limit production of $NO_x$ emissions. This change in reaction conditions can also increase the tolerance for increased temperatures at inlet 30, further reducing pressure loss across apparatus 90 (i.e., between inlet 30 and turbine nozzle 44) because apparatus 90 is free of mixing zones, and accommodates combustion throughout reaction chamber 92 without the use of dedicated mixing zones and/or ducts.

Apparatus 90 can optionally include other components and features discussed elsewhere herein as components of apparatuses 50, 70 or reheat combustors 52, 72 where desired and/or applicable. For example, apparatus 90 can include a valve 98 positioned between fuel supply line 34 and conduit 56 to injectors 94. Fuel supply line 34 can deliver most of fuel 32 therein (e.g., at least two-thirds of a total fluid flow) to another combustor independent from apparatus 90, e.g., combustor 12 (FIG. 1). Valve 98 can divert a portion of fuel 32 in fuel supply line 34 to conduit 56 and injectors 94 to initiate combustion reactions within reaction chamber 92 of apparatus 90. In an example embodiment, valve 98 can be sized to divert up to one third of the total flow of fuel 32 in fuel supply line 34 to injectors 94.

To further control the amount of fuel 32 provided to injectors 94, apparatus 90 can also include controller 64 operatively connected to valve 98. Sensor(s) 66 can also be in communication with controller 64 to determine a temperature of inlet 40, an outlet temperature (i.e., a temperature within or beyond turbine nozzle 44) and/or an emissions output from reaction chamber 92. Controller 64 can be configured to adjust the position of (i.e., open or close) valve 98 by use of program code and/or software provided therein and with reference to values determined with sensor(s) 66. For example, as discussed elsewhere herein, controller 64 can close valve 98 to reduce the amount of fuel 32 provided to apparatus 90 in response to emission outputs determined with sensor(s) 66 being too high, open valve 98 based on a temperature of inlet 30 being greater than a threshold value, and/or otherwise adjust the position of valve 98 based on operational conditions of apparatus 90 determined with sensor(s) 66.

Figure 8:
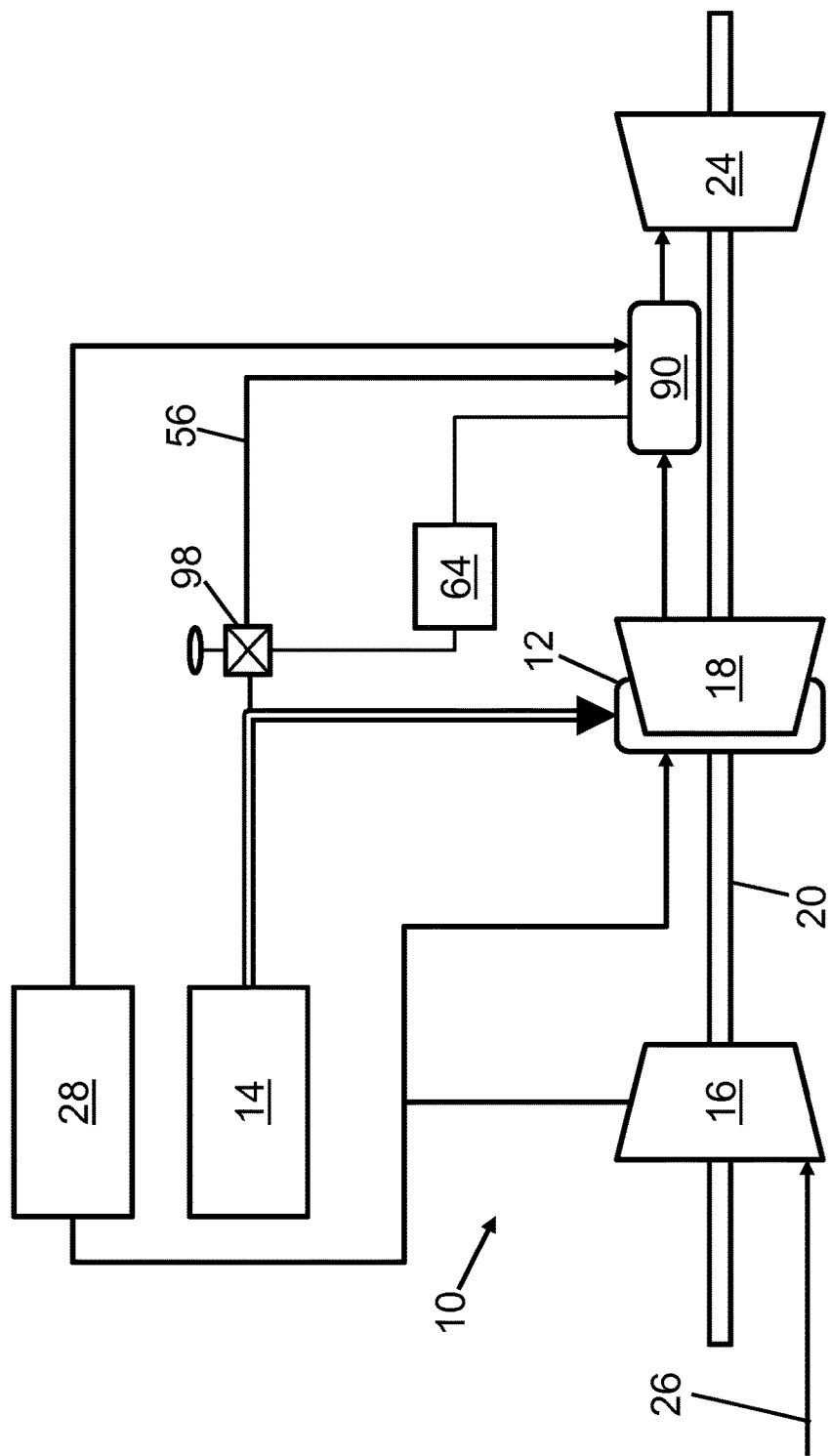
FIG. 8 provides a schematic view of a turbomachine according to embodiments of the present disclosure.

Turning to FIGS. 7 and 8 together, embodiments of the present disclosure can provide a turbomachine 100 adapted to include apparatus 90 therein. Turbomachine 100 can include combustor 12 in the form of a first stage combustor for receiving fuel from fuel supply 14 via fuel supply line 34. Combustor 12 can also be in fluid communication with compressor 16 and/or carrier gas supply 28 to receive air which reacts with fuel from fuel supply 14. Apparatus 90 can be positioned between HP gas turbine 18 and LP gas turbine 24, thereby causing reaction chamber 92 therein to be in fluid communication with an upstream turbine stage and a downstream turbine stage (e.g., HP gas turbine 18 (upstream) and LP gas turbine 24 (downstream)). Conduit 56 can deliver fuel 32, which may be intermixed with air 26 drawn from inlet 30, to reaction chamber 92. The temperature within reaction chamber 92 may cause combustion reactions to occur therein. At least some fuel 32 can react with excess portions of air 26 yielded from the upstream turbine stage (e.g., HP gas turbine 18), which may be in the form of air from compressor 12 and/or carrier gas delivered from carrier gas supply 28. In an embodiment, fuel entering reaction chamber 92 from conduit 56 and injectors 94 can combust less than approximately one millisecond after entering reaction chamber 92.

As discussed elsewhere herein, turbomachine 100 can include valve 98 operatively connected to conduit 56 for controlling a magnitude of fuel 32 delivered to injectors 94 from fuel supply line 34. Valve 98, more specifically, can control a relative quantity of fuel provided from fuel supply line 34. The amount of fuel 32 provided with valve 98 can be limited by, e.g., a physical limit on valve 98 (maximum positions of openness and/or closure), a user-determined maximum value stored in controller 64 and applied to the adjusting of valve 98, and/or combinations of these techniques and other techniques. In an example embodiment, valve 98 can divert up to approximately one third of the fuel 32 within fuel supply line 34 into conduit 56. The position of valve 98 and the amount of fuel 32 provided into conduit 56 can be controlled by, e.g., controller 64 coupled to valve 98. Controller 64 can adjust the position of valve 98 based on, e.g., values determined with sensor(s) 66 in communication with controller 64. The other features discussed herein with regard to apparatus 90 can also be applied to turbomachine 100 where desired. As examples, and as shown in FIG. 7, injectors 94 may be oriented substantially in opposition to a flow of a fluid through reaction chamber 92, and/or injectors 94 can inject carrier gas and fuel into reaction chamber 92 in a ratio of approximately one-to-one.

The allocation of fuel between combustor 12 and apparatus 90 can be set and adjusted using controller 64 based on the current and/or desired operating conditions of turbomachine 100, and the composition of a particular fuel 32 to be combusted. For instance, combustor 12 of turbomachine 100 can be allocated approximately two-thirds of the total fuel in fuel supply 14, and the temperature at inlet 30 of apparatus 90 can be, e.g., approximately 1340° C. to provide a shortened autoignition delay time (e.g., less than approximately 0.5 milliseconds). In another example, the operating temperatures of combustor 12 and apparatus 90 within turbomachine 100 may be approximately equal to each other. The allocation of fuel from fuel supply 14 between combustor 12 and apparatus 90 can determine, e.g., the firing temperature within each stage. In addition, a total amount of carrier gas provided to combustor 12 and apparatus 90 can be chosen to maintain a predetermined a gas turbine exhaust temperature and this amount of carrier gas can be continuously and/or periodically adjusted via controller 64. Other variables affected by the amount and allocation of fuel 32 and carrier gas 26 can include: emissions from turbomachine 100, total fuel intake, and tolerance ranges for the temperature of inlet 30.

Figure 9:
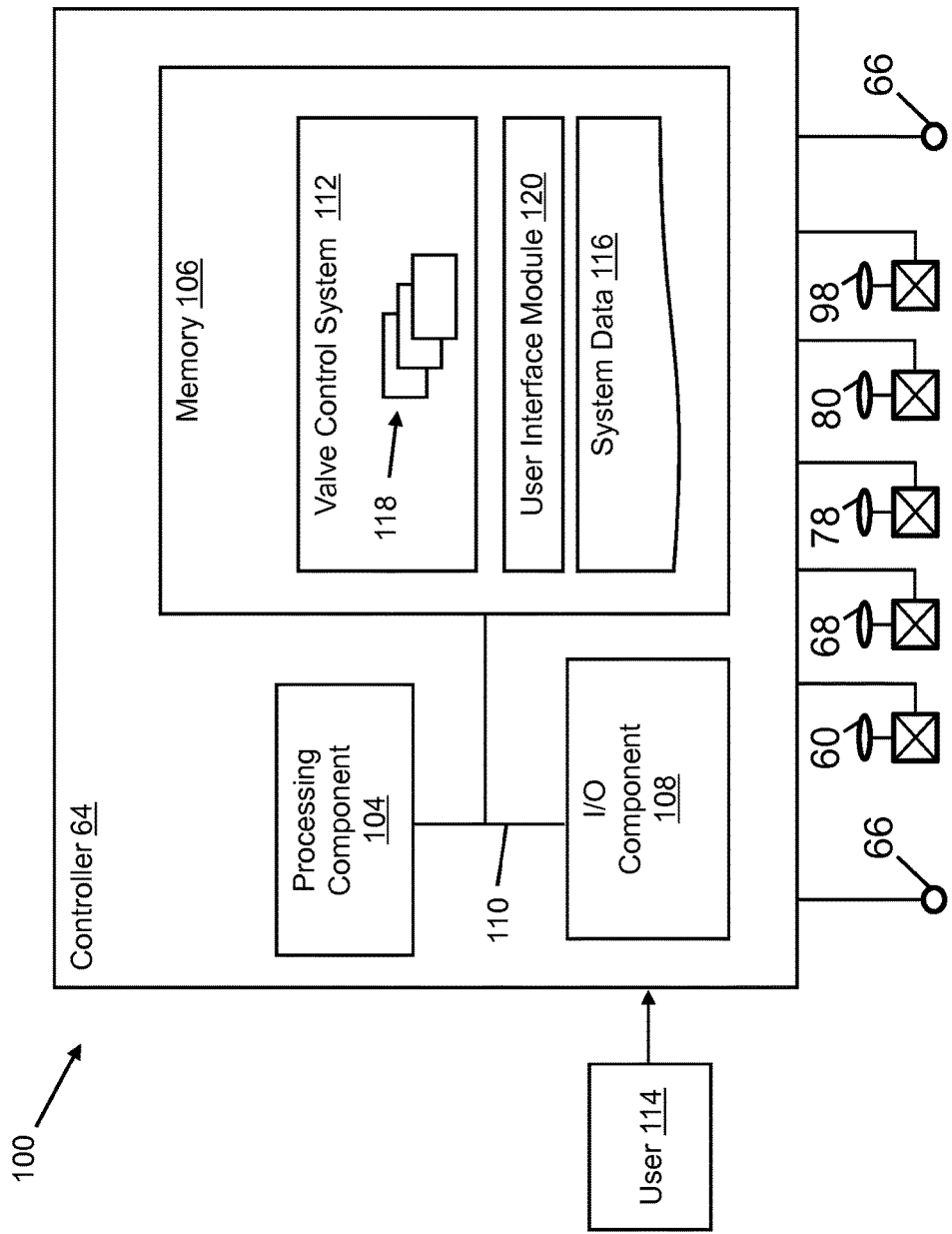
FIG. 9 depicts an illustrative environment which includes a controller interacting with several sensors and valves according to embodiments of the present disclosure.

FIG. 9 depicts an illustrative environment 100 in communication with sensor(s) 66 for controlling one or more valve(s) 60, fuel supply valve(s) 68, splitting valve (s) 78, carrier gas control valve(s) 80, and/or valve(s) 98 (collectively, "valve(s)") according to embodiments. To this extent, environment 100 includes controller 64 for performing processes and imparting electrical commands to control valve(s) 60, 68, 78, 80, 98 and associated systems and tools. Although each type of valve 60, 68, 78, 80, 98 discussed herein is shown by example in FIG. 9, it is understood that environment 100 with controller 64 can be used with only one or multiple embodiments of the present disclosure discussed herein, including without limitation one or more reheat combustors 52, 72 (FIGS. 3-6) and/or apparatuses 50, 70, 90 (FIGS. 3-8). Controller 64 is shown as including a valve control system 112, which makes controller 64 operable to direct and operate valve(s) 60, 68, 78, 80, 98 and associated systems and tools described herein and implement any/all of the embodiments described herein. In operation, valve control system 112 can issue electrical commands, which in turn may be converted into mechanical actions (e.g., an action of opening and closing one or more valves 60, 68, 78, 80, 98) in response to particular conditions. The conditions for opening and/or closing valves 60, 68, 78, 80, 98 can include, e.g., a temperature of inlet 30 (FIGS. 2-7) or an emission output from turbine nozzle 44 (FIGS. 2-7) being within or outside a range of threshold values, or other operating variables and/or values determined with sensor(s) 66 being within or outside a particular range of threshold values.

Controller 64 is shown including a processing component 104 (e.g., one or more processors), a memory 106 (e.g., a storage hierarchy), an input/output (I/O) component 108 (e.g., one or more I/O interfaces and/or devices), and a communications pathway 110. In general, processing component 104 executes program code, such as valve control system 112, which is at least partially fixed in memory 106. While executing program code, processing component 104 can process data, which can result in reading and/or writing transformed data from/to memory 106 and/or I/O component 108 for further processing. Pathway 110 provides a communications link between each of the components in controller 64. I/O component 108 can comprise one or more human I/O devices, which enable a human or system user 114 to interact with the controller 64 and/or one or more communications devices to enable user(s) 114 to communicate with the controller 64 using any type of communications link. To this extent, valve control system 112 can manage a set of interfaces (e.g., graphical user interface(s), application program interface, etc.) that enable user(s) 112 to interact with valve control system 112. Further, valve control system 112 can manage (e.g., store, retrieve, create, manipulate, organize, present, etc.) data, such as system data 116 (including measured or recorded temperatures, emission outputs, etc.) using any solution.

In any event, controller 64 can comprise one or more general-purpose or specific-purpose computing articles of manufacture (e.g., computing devices) capable of executing program code, such as valve control system 112, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the valve control system 112 can be embodied as any combination of system software and/or application software.

Further, the valve control system 112 can be implemented using a set of modules 118. In this case, a module 118 can enable the controller 64 to perform a set of tasks used by valve control system 112, and can be separately developed and/or implemented apart from other portions of valve control system 112. Controller 64 can also include a user interface module 120 for displaying (e.g., via graphics, text, and/or combinations thereof) a particular user interface on a display component such as a monitor. When fixed in memory 106 of controller 64 that includes a processing component 104, a module is a substantial portion of a component that implements the functionality. Regardless, it is understood that two or more components, modules and/or systems may share some/all of their respective hardware and/or software. Further, it is understood that some of the functionality discussed herein may not be implemented or additional functionality may be included as part of controller 64.

When controller 64 comprises multiple computing devices, each computing device may have only a portion of valve control system 112 fixed thereon (e.g., one or more modules 118). However, it is understood that controller 64 and valve control system 112 are only representative of various possible equivalent computer systems that may perform a process described herein. To this extent, in other embodiments, the functionality provided by controller 64 and valve control system 112 can be at least partially implemented by one or more computing devices that include any combination of general and/or specific purpose hardware with or without program code. In each embodiment, the hardware and program code, if included, can be created using standard engineering and programming techniques, respectively.

Regardless, when controller 64 includes multiple computing devices, the computing devices can communicate over any type of communications link. Further, while performing a process described herein, controller 64 can communicate with one or more other computer systems using any type of communications link. In either case, the communications link can comprise any combination of various types of wired and/or wireless links; comprise any combination of one or more types of networks; and/or use any combination of various types of transmission techniques and protocols.

It is understood that aspects of the invention further provide various alternative embodiments. For example, in one embodiment, the present disclosure provides a controller for adjusting an amount of fuel and/or air provided to components of reheat combustors 52, 72 (FIGS. 3-6) and/or apparatuses 50, 70, 90 (FIGS. 3-7) by adjusting the position of valve(s) 60, 68, 78, 80, 98. In other embodiments, using reheat combustors 52, 72, and/or apparatus 90 can include operating controller 64 manually (e.g., by a technician) or by the intervention of one or more computer systems operatively connected thereto. It is understood that controller 64 may serve technical purposes in other settings beyond general operation, including without limitation: inspection, maintenance, repair, replacement, testing, etc.

Valve control system 112 can be in the form of a computer program fixed in at least one computer-readable medium, which when executed, enables controller 64 to operate and adjust the position of valve(s) 60, 68, 78, 80, 98. To this extent, the computer-readable medium includes program code which implements some or all of the processes and/or embodiments described herein. It is understood that the term "computer-readable medium" comprises one or more of any type of tangible medium of expression, now known or later developed, from which a copy of the program code can be perceived, reproduced or otherwise communicated by a computing device. For example, the computer-readable medium can comprise: one or more portable storage articles of manufacture; one or more memory/storage components of a computing device; paper; etc.

The apparatus and method of the present disclosure is not limited to any one particular gas turbine, combustion system, internal combustion engine, power generation system or other system, and may be used with other power generation systems and/or systems (e.g., combined cycle, simple cycle, nuclear reactor, etc.). Additionally, the apparatus of the present invention may be used with other systems not described herein that may benefit from the increased operational range, efficiency, durability and reliability of the apparatus described herein. Technical effects of the present disclosure can include, without limitation, the ability to increase, decrease, or otherwise adjust the inlet temperatures and amounts of combustion in combustors and reheat combustors of a power generation system, e.g., by adjusting the amount of fuel and carrier gas allocated between different combustors and portions of the same combustor.

Embodiments of the present disclosure can provide several technical and commercial advantages. As one example, embodiments of the present disclosure can be provided as modifications or retrofitted components to existing gas turbine systems. Combining embodiments of the present disclosure with conventional power generation systems and/or components thereof can allow a greater fraction of the total gas turbine fuel flow to be provided to a first stage combustor, with a lower burden on any reheat combustors in the system and greater operational efficiency. In addition, the various embodiments discussed herein can permit a first stage combustor to combust fuel at a higher temperature, because the staged combustion reactions in a downstream reheat combustor can be staged in multiple reaction zones as discussed herein.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
   a turbine nozzle positioned downstream of a reheat combustor, wherein the turbine nozzle defines a throat separating an aft portion of the reheat combustor from a subsequent turbine stage of a power generation system;
   at least one nozzle injector embedded within a surface of the turbine nozzle and oriented substantially in opposition to a direction of a fluid flow from the reheat combustor, and positioned downstream from another fuel injector in fluid communication with the reheat combustor, wherein the at least one nozzle injector is in fluid communication with a single reaction zone within the reheat combustor;
   a conduit in fluid communication with the at least one nozzle injector, wherein the conduit delivers at least one of a fuel and a carrier gas to the at least one nozzle injector;
   a valve between a fuel supply line to the reheat combustor and the conduit for controlling an amount of the fuel provided from the fuel supply line to the at least one nozzle injector;
   a controller operatively connected to the valve;
   a temperature sensor in communication with the controller for measuring an inlet temperature of the reheat combustor; and an emissions sensor in communication with the controller for measuring an emissions output of the reheat combustor, wherein the controller adjusts a position of the valve to increase an amount of fuel in the conduit in response to the inlet temperature exceeding a temperature tolerance, or the emissions output of the reheat combustor exceeding an emissions tolerance.

2. The apparatus of claim 1, wherein the fuel supply line is in fluid communication with a mixing duct positioned upstream of the turbine nozzle, and the valve diverts at most approximately thirty percent of the fuel from the fuel supply line to the at least one nozzle injector.

3. The apparatus of claim 1, wherein a separation distance between the at least one nozzle injector and the throat causes the fuel to ignite before entering the subsequent turbine stage.

4. The apparatus of claim 1, wherein the conduit delivers the fuel and the carrier gas to the at least one nozzle injector.

5. A reheat combustor comprising:
a reaction chamber positioned downstream of a mixing duct and upstream of a turbine nozzle to a subsequent turbine stage of a power generation system, wherein the reaction chamber includes a fore section and an aft section, and wherein an air and a first portion of a fuel delivered from the mixing duct combust in the fore section of the reaction chamber;

at least one nozzle injector positioned on the turbine nozzle to the subsequent turbine stage and oriented substantially in opposition to a direction of a fluid flow from the reaction chamber, and positioned downstream from another fuel injector in fluid communication with the reaction chamber, wherein the at least one nozzle injector delivers a carrier gas and a second portion of the fuel to the aft section of the reaction chamber and wherein the turbine nozzle to the subsequent turbine stage defines a throat separating the aft section of the reaction chamber from the subsequent turbine stage of the power generation system, and wherein the at least one nozzle injector is in fluid communication with a single reaction zone within the reaction chamber; and a conduit in fluid communication with the at least one nozzle injector and a fuel supply line, wherein the fuel supply line is in fluid communication with the mixing duct, and wherein the conduit delivers the carrier gas and the second portion of the fuel to the at least one nozzle injector;

a valve between the fuel supply line and the conduit for controlling an amount of the second portion of the fuel provided from the fuel supply line to the at least one nozzle injector;

a controller operatively connected to the valve;

a temperature sensor in communication with the controller for measuring an inlet temperature of the reheat combustor; and an emissions sensor in communication with the controller for measuring an emissions output of the reheat combustor, wherein the controller adjusts a position of the valve to increase an amount of fuel in the conduit in response to the inlet temperature exceeding a temperature tolerance, or the emissions output of the reheat combustor exceeding an emissions tolerance.

6. The reheat combustor of claim 5, wherein the valve diverts at most approximately thirty percent of the fuel from the fuel supply line to the at least one nozzle injector as the second portion of the fuel.

7. The reheat combustor of claim 5, wherein a separation distance between the at least one nozzle injector and the throat allows the fuel to ignite and react before entering the subsequent turbine stage.

8. The reheat combustor of claim 5, further comprising an air conduit in fluid communication with the at least one nozzle injector and the reaction chamber, wherein the air conduit delivers a carrier gas to the at least one nozzle injector, and the carrier gas comprises unreacted air from one of an external air supply and a combustor in fluid communication with the power generation system.

* * * * *